US012494978B2

(12) United States Patent
Reddy

(10) Patent No.: US 12,494,978 B2
(45) Date of Patent: Dec. 9, 2025

(54) LATENCY BASED NETWORK PATH SCORING

(71) Applicant: Palo Alto Networks, Inc., Santa Clara, CA (US)

(72) Inventor: Gopal Gadekal Reddy, Fremont, CA (US)

(73) Assignee: Palo Alto Networks, Inc., Santa Clara, CA (US)

(*) Notice: Subject to any disclaimer, the term of this patent is extended or adjusted under 35 U.S.C. 154(b) by 551 days.

(21) Appl. No.: 17/811,627

(22) Filed: Jul. 11, 2022

(65) Prior Publication Data

US 2023/0091734 A1 Mar. 23, 2023

Related U.S. Application Data

(60) Provisional application No. 63/261,571, filed on Sep. 23, 2021.

(51) Int. Cl.
H04L 43/0829 (2022.01)
H04L 43/062 (2022.01)
H04L 43/067 (2022.01)
H04L 43/0852 (2022.01)
H04L 43/0864 (2022.01)
H04L 43/0882 (2022.01)
(Continued)

(52) U.S. Cl.
CPC ........ H04L 43/0841 (2013.01); H04L 43/062 (2013.01); H04L 43/067 (2013.01); H04L 43/0852 (2013.01); H04L 43/0864 (2013.01); H04L 43/0882 (2013.01); H04L 43/106 (2013.01); H04L 43/50 (2013.01)

(58) Field of Classification Search
CPC ..... H04L 41/40; H04L 43/062; H04L 43/067; H04L 43/0841; H04L 43/0852; H04L 43/0864; H04L 43/0882; H04L 43/0894; H04L 43/10; H04L 43/106; H04L 43/16; H04L 43/50

See application file for complete search history.

(56) References Cited

U.S. PATENT DOCUMENTS 6,320,585 B1   11/2001   Engel et al.
10,897,424 B1   1/2021   Dhanabalan et al.
(Continued)

FOREIGN PATENT DOCUMENTS

CN   108965066 A   * 12/2018   ......... H04L 43/0876
EP   1811683 A2   7/2007
WO   2008001157 A1   1/2008

OTHER PUBLICATIONS

Popescu; Diana A., "Latency-driven performance in data centres", Ph.D. thesis (University of Cambridge, 2019• repository.cam.ac.uk), Total Pages: 192 (Year: 2019).*

(Continued)

Primary Examiner — Shah M Rahman
(74) Attorney, Agent, or Firm — Gilliam IP PLLC

(57) ABSTRACT

A network path scoring system is disclosed herein that scores "health" of network paths based on latency data. The system scores health of a network path based on additional latency of the network path for a current time interval, additional latency expected for the network path, and current load. The scoring uses a non-stationary range that is based on expected additional latency (e.g., engineered/injected latency) and coefficient(s) that vary with load.

20 Claims, 9 Drawing Sheets

(51) Int. Cl.
*H04L 43/106* (2022.01)
*H04L 43/50* (2022.01)

(56) References Cited

U.S. PATENT DOCUMENTS

| | | | |
|---|---|---|---|
| 11,108,651 B1* | 8/2021 | Mermoud | H04L 45/22 |
| 11,252,106 B2* | 2/2022 | Cidon | H04L 61/4511 |
| 11,405,284 B1 | 8/2022 | Evans et al. | |
| 2006/0182034 A1* | 8/2006 | Klinker | H04L 45/04 370/248 |
| 2009/0164657 A1* | 6/2009 | Li | H04L 65/80 709/233 |
| 2010/0094950 A1* | 4/2010 | Zuckerman | H04L 67/1008 709/213 |
| 2010/0142366 A1 | 6/2010 | Bugenhagen et al. | |
| 2013/0315062 A1* | 11/2013 | Riedl | H04L 43/0852 370/230 |
| 2013/0318022 A1* | 11/2013 | Yadav | G06N 5/02 706/46 |
| 2014/0068106 A1* | 3/2014 | Turlington | H04L 41/0659 709/241 |
| 2015/0195171 A1 | 7/2015 | Mermoud | |
| 2016/0142274 A1* | 5/2016 | Mulkey | H04L 43/0823 709/224 |
| 2016/0218979 A1* | 7/2016 | Roh | H04L 43/16 |
| 2017/0063705 A1* | 3/2017 | Gilson | H04L 47/286 |
| 2017/0339059 A1 | 11/2017 | Averi et al. | |
| 2017/0366650 A1* | 12/2017 | Zhu | H04L 69/16 |
| 2018/0262414 A1 | 9/2018 | Burbridge et al. | |
| 2018/0270141 A1 | 9/2018 | Burbridge et al. | |
| 2018/0270144 A1* | 9/2018 | Jiang | H04L 43/0852 |
| 2018/0279108 A1 | 9/2018 | So et al. | |
| 2019/0036828 A1 | 1/2019 | Bajaj | |
| 2019/0041835 A1 | 2/2019 | Cella | |
| 2019/0052565 A1* | 2/2019 | Modi | H04L 47/11 |
| 2019/0081959 A1* | 3/2019 | Yadav | H04L 63/02 |
| 2019/0097912 A1* | 3/2019 | Salam | G06N 3/08 |
| 2019/0109776 A1 | 4/2019 | Li et al. | |
| 2020/0014619 A1* | 1/2020 | Shelar | H04L 43/087 |
| 2020/0145313 A1* | 5/2020 | Raindel | H04L 43/106 |
| 2020/0296051 A1 | 9/2020 | Huiban et al. | |
| 2020/0344163 A1 | 10/2020 | Gupta et al. | |
| 2020/0382429 A1* | 12/2020 | Bajaj | H04L 43/08 |
| 2020/0389808 A1* | 12/2020 | Wong | H04W 28/0236 |
| 2020/0391766 A1 | 12/2020 | Wang et al. | |
| 2021/0092062 A1* | 3/2021 | Dhanabalan | H04L 47/2425 |
| 2021/0144082 A1* | 5/2021 | Bisht | H04L 45/02 |
| 2021/0320854 A1* | 10/2021 | King, V. | H04L 43/0852 |
| 2022/0006740 A1* | 1/2022 | Tourrilhes | H04L 47/11 |
| 2022/0038332 A1* | 2/2022 | Umakanth | H04L 41/142 |
| 2023/0088062 A1 | 3/2023 | Reddy | |
| 2023/0099723 A1 | 3/2023 | Reddy | |
| 2023/0101314 A1 | 3/2023 | Reddy | |
| 2023/0105896 A1 | 4/2023 | Bienas et al. | |
| 2024/0195733 A1* | 6/2024 | Sanvito | H04L 41/16 |

OTHER PUBLICATIONS

Martin et al., "Delay-Based Congestion Avoidance for TCP", IEEE/ACM Transactions on networking, 2003, vol. 11, No. 3, pp. 356-369, Jun. 2003 (Year: 2003).*
U.S. Appl. No. 17/811,603, Non-Final Office Action mailed Mar. 4, 2024, 28 pages.
EP Application No. 22197084.1, Extended European Search Report mailed Feb. 3, 2023, 8 pages.
U.S. Appl. No. 17/811,608, Office Action mailed Dec. 14, 2023, 8 pages.
U.S. Appl. No. 17/811,620, Final Office Action mailed May 9, 2025, 26 pages.
"ML | Binning or Discretization", GeeksforGeeks <https://www.geeksforgeeks.org/ml-binning-or-discretization/>. Articles published in Jun., Jul., and Aug. 2021, [retrieved on May 2, 2025] via the Wayback Machine archive <https://web.archive.org/web/20210801041638/https://www.geeksforgeeks.org/ml-binning-or-discretization/>.
U.S. Appl. No. 17/811,620, Non-Final Office Action mailed Dec. 6, 2024, 22 pages.
"Math is Fun on Percentage Change", Retrieved from https://web.archive.org/web/20210408035221/https://www.mathsisfun.com/numbers/percentage-change.html (Year: 2021).

* cited by examiner

```
                    ┌─────────────────────────────────────────────────────────────┐
                    │ DETERMINE NEARLY REAL-TIME (NRT) LATENCY SCORE FOR A NETWORK PATH │
                    │ BASED ON THE LATENCY THRESHOLD(S) AND THE CURRENT PATH LATENCY    │
                    └─────────────────────────────────────────────────────────────┘
                                                │
                                                ▼
           620 ─┐   ┌──────────────────────────────────────┐
                │   │   CALCULATE CURRENT ADDITIONAL LATENCY │
                    └──────────────────────────────────────┘
                                                │
                                                ▼                    621
                                         ╱───────────────╲
                                        ╱  CURRENT ADDITIONAL ╲
                                       ╱  LATENCY <= LOWER    ╲
                                       ╲    THRESHOLD?        ╱
                                        ╲───────────────╱
                                YES  ╱                ╲  NO
                                    ╱                  ╲
                                                                                      625
                    623                                                                ─┐
                     ─┐                           ┌──────────────────────────────────────┐
                      ▼                           │ SCORE = 100 − MAXIMUM(100,             │
               ┌──────────────┐                   │ ((Current_Additional_Latency − Lower_Threshold) │
               │  SCORE = 100 │                   │ *100/(Upper_Threshold− Lower_Threshold))) │
               └──────────────┘                   └──────────────────────────────────────┘
                       │                                           │
                       └───────────────────○───────────────────────┘
                                           │
                                           ▼
                                       ┌───────┐
                                       │  END  │
                                       └───────┘
```

FIG. 6

LATENCY BASED NETWORK PATH SCORING

BACKGROUND

The disclosure generally relates to electronic communication techniques (e.g., CPC class H04) and arrangements for maintenance of administration of packet switching networks (e.g., CPC subclass H04L 41/00).

The terms wide area network (WAN) and local area network (LAN) identify communications networks of different geographic scope. For a LAN, the geographic area can range from a residence or office to a university campus. For a WAN, the geographic area can be defined with respect to a LAN—greater than the area of a LAN. In the context of telecommunications, a circuit refers to a discrete path/link that carries a signal through a network between two remote locations. A circuit through a WAN can be a physical circuit or a virtual/logical circuit. A physical WAN circuit refers to a fixed, physical path through a network. A dedicated or leased line arrangement uses a physical WAN circuit. A logical WAN circuit refers to a path between endpoints that appears fixed but is one of multiple paths through the WAN that can be arranged. A logical circuit is typically implemented according to a datalink and/or network layer protocol, although a transport layer protocol (e.g., transmission control protocol (TCP)) can support a logical circuit.

The Software-defined Network (SDN) paradigm decouples a network management control plane from the data plane. A SDN controller that implements the control plane imposes rules on switches and routers (physical or virtual) that handle Internet Protocol (IP) packet forwarding in the data plane. The limitations of managing traffic traversing a WAN invited application of the SDN paradigm in WANs.

BRIEF DESCRIPTION OF THE DRAWINGS

Embodiments of the disclosure may be better understood by referencing the accompanying drawings.

FIG. 6 is a flowchart of example operations for determining the NRT latency score for the network path based on an acceptable/expected additional latency range and the current additional path latency.

DESCRIPTION

The description that follows includes example systems, methods, techniques, and program flows that embody aspects of the disclosure. However, it is understood that this disclosure may be practiced without these specific details. For instance, this disclosure refers to example formulas or expressions for score calculation. However, mathematical variations are possible that still capture the relationships among thresholds and current latency for scoring. For instance, scoring can be based on linear or non-linear mapping of a current latency or current additional latency to a range of latency or range of additional latency that is acceptable or expected. In other instances, well-known instruction instances, protocols, structures and techniques have not been shown in detail in order not to obfuscate the description.

Overview

A network path scoring system is disclosed herein that scores "health" of network paths based on latency data. The system scores health of a network path based on additional latency of current time interval, a non-stationary range of expected/acceptable additional latency ("additional latency range"), bandwidth capacity ("bandwidth") of a corresponding SD-WAN circuit ("network circuit" or "circuit"), and bandwidth utilization ("load") of the circuit. The scoring occurs in nearly real-time to aid with detection of network problems, including transient or ephemeral problems which can impact application performance and possibly violate a service level agreement. The scoring uses a non-stationary additional latency range that is based on base latency and engineered/injected latency ("added latency"). The latency range is non-stationary because it varies as a function of load, which can change across scoring intervals. The network path scoring system scores the network path based on the additional latency of the current time interval relative to the additional latency range for the current load. The scoring system also tracks latency behavior per load bin and independent of load to aid in adaptation of base latency, likely due to a route change.

Example Illustrations

Figure 1:
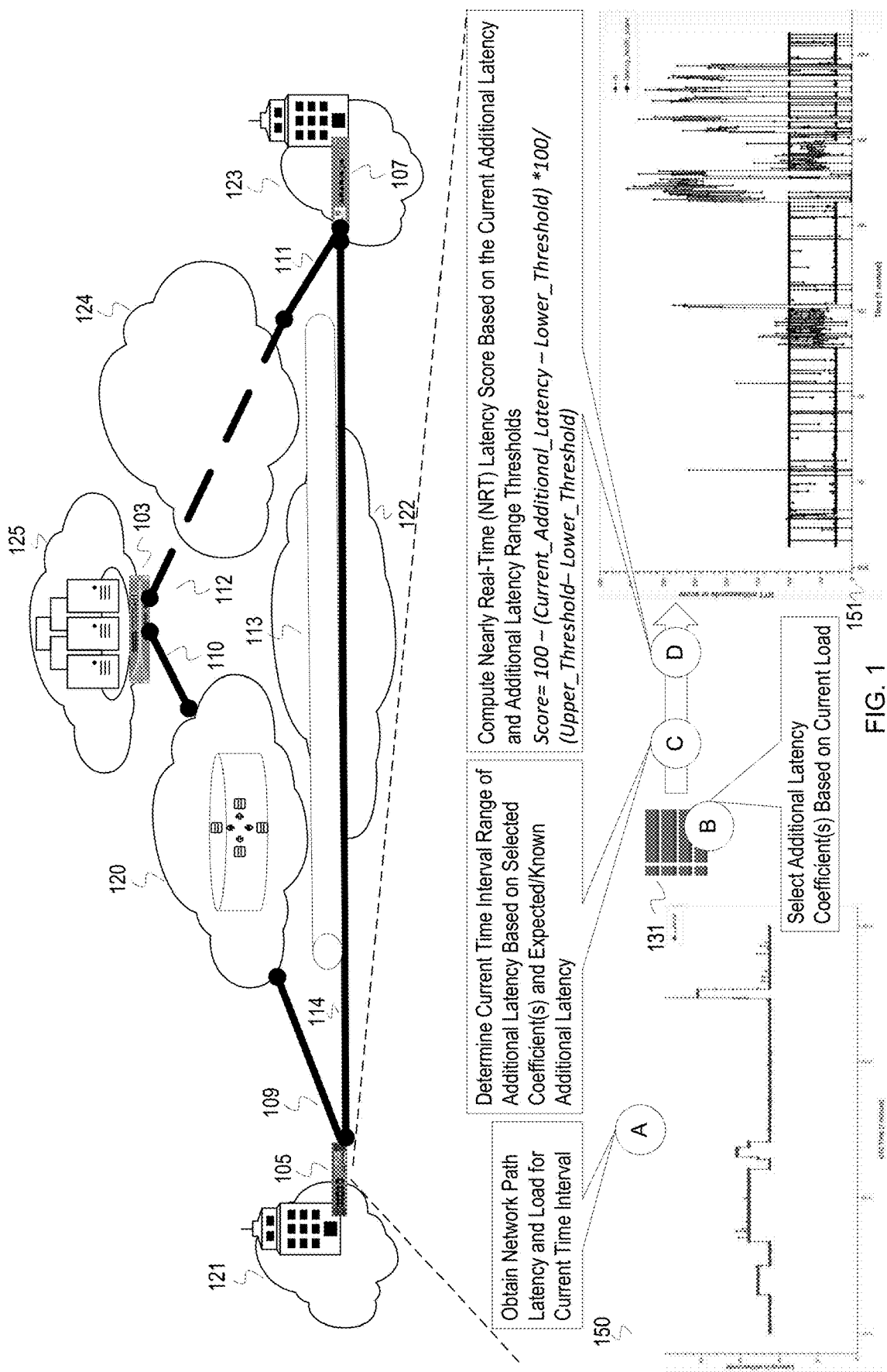
FIG. 1 depicts a diagram of a network appliance scoring a network path of a software-defined wide area network in nearly real-time based on latency.

FIG. 1 depicts a diagram of a network appliance scoring a network path of a software-defined wide area network in nearly real-time based on current network path latency and expected latency. A network path may traverse circuits between customer edge devices at different sites and provider edge devices and a multi-protocol label switching underlay of a provider(s) or even different underlays of different providers. A network path may be a tunnel provisioned between the endpoints. A network path may be a point-to-point or point-to-multi-point circuit between sites. Moreover, the route of a network path can change. Regardless of the particular nodes and infrastructure being traversed, the communication quality of the network path is measured based on probes transmitted between the endpoints which define the path. Bandwidth utilization is determined with respect to bandwidth capacity as defined at the endpoint devices. Despite the myriad incarnations of a network path, the bandwidth capacity is indicated as a setting/configuration for a circuit corresponding to a network path(s). Due to the multitude of connection options, layouts/configurations (e.g., overlay, underlay, etc.), and technologies in network communications, this example illustration illustrates a single, relatively simple scenario that includes three customer edge devices 103, 105, 107. The edge device 103 is at a data center hosted on a network 125, which may be an on-premise or an off-premise data center. The edge device 105 is at a branch office network 121 and the edge device 107 is at a branch office network 123. The edge device 105 is communicatively coupled with the edge device 103 via a network path that traverses a network 120 that provides a multi-protocol label switching service. The edge device 105 connects to the network 120 via a circuit 109 and the edge device 103 connects to the network 120 via a circuit 110. The edge device 105 is communicatively coupled with the edge device 107 via a network path 113 (illustrated as a tunnel) provisioned on a circuit 114 which traverses a private WAN 122. The edge device 103 is communicatively coupled with the edge device 107 via a network path which traverses a public WAN 124 along a direct internet connection 112. The edge device 107 connects to the public WAN 124 via a circuit 111. The network paths form part of an overlay (e.g., a secure network fabric or virtual private network (VPN)) that securely interconnects geographically disparate sites/networks of an organization.

FIG. 1 is annotated with a series of letters A-D which represent operational stages of the scoring system. Although these stages are ordered for this example, the stages illustrate one example to aid in understanding this disclosure and should not be used to limit the claims. Subject matter falling within the scope of the claims can vary with respect to the order and some of the operations. In addition, each stage can involve one operation or multiple operations.

At stage A, the edge device 105 obtains latency data (e.g., round trip time (RTT) data) for a current time interval. A "current" time interval refers to a time interval that has most recently elapsed. The edge device 105 also obtains ingress/egress circuit load for the current time interval. A nearly real-time (NRT) network path latency scoring system ("scoring system") can be implemented as a network appliance with a hardware or software form factor. In FIG. 1, the edge device 105 implements the scoring system. The edge devices 103, 105, 107 or another system(s) in communication with the edge devices send probes per network path at a time interval smaller than a time interval that will be used for scoring ("scoring interval"). For example, probes can be transmitted at sub-second time intervals for minute granularity scoring. The edge device 105 may obtain the latency data directly (e.g., compute latency based on the probe measurements over the scoring time interval), access the latency for the scoring time interval from a data structure, interact with another process that computes the latency from the probes, etc. The edge device 105 updates a visualization 150 of time-series latency for a network path to be scored.

At stage B, the edge device 105 selects an additional latency coefficient(s) based on the load over the current time interval. The scoring system stores additional latency coefficients in association with load buckets in, for example, an in-memory data structure. FIG. 1 illustrates a table 131 as the data structure hosting the bucketized additional latency coefficients. Latency based path scoring uses a base latency for determining current additional latency (offset from the base latency) and known/expected additional latency, which at least includes added latency. While the base latency depends on distance, which can be physical or logical (e.g., number of hops), the additional latency increases with load. Added latency (i.e., injected/engineered latency in last mile bandwidth shapers) may be a primary contributor to additional latency, but intermediary devices may also add latency. With observations and/or expert knowledge, the expected additional latency can be calculated, for example, with knowledge of buffer sizes in bandwidth shapers and circuit bandwidth. The additional latency coefficients are defined to account for the multiplying effect load has on the expected additional latency. For example, traffic shapers may add 10 milliseconds (ms) of latency at low load (e.g., load<20%) and 20 ms of latency at 40% load. Assuming an additional latency coefficient for a lower threshold and another for an upper threshold, a lower threshold additional latency coefficient of 2 and an upper threshold additional latency coefficient of 4 can be set for a load bucket that encompasses 80% load since the load will be an aggregate of loads. In the case of the network path being a tunnel provisioned on circuit, the scoring system aggregates the ingress load and the egress load of the circuit that supports the network path resulting in load buckets that range from 0 to 200 since each load can range from 0 to 100 percent. If the ingress/egress bandwidth capacities of a circuit are different, the load of the higher bandwidth capacity is normalized before aggregation with the load of the lower bandwidth capacity. Normalization accounts for the differing proportional impact of load on additional latency when capacities are different.

At stage C, the edge device 105 determines an additional latency range for the current time interval. Determining the range is determining thresholds that define the range—a lower and an upper thresholds based on the coefficients defined for the current load. If the lower threshold is 0 ms, then only a coefficient for determining the upper threshold was selected from the table 131. Assuming an implementation that defines and selects different coefficients for the different thresholds, the edge device 105 applies the lower threshold additional latency coefficient to the expected additional latency to calculate the lower threshold. The edge device 105 applies the upper threshold additional latency coefficient to the expected additional latency to calculate the upper threshold.

At stage D, the edge device 105 computes a NRT latency path score based on the current additional latency and the latency range as defined by the upper and lower thresholds. The current additional latency is determined as an offset (above or below) from a base latency, which can change across time intervals. The latency range is a range of expected/acceptable additional latencies given the current load for the path being scored. The edge device 105 computes the NRT score according to the expression:

$$Score=100-(Current\_Additional\_Latency-Lower\_Threshold)*100/(Upper\_Threshold-Lower\_Threshold).$$

The above formula for the score allows the score to be presented as an intuitive, user-friendly score on a 0 to 100 scale. Implementations may allow for negative scores to facilitate, for example, expression of severity of an issue.

After computing the latency score, the edge device 105 can then update a visual representation 151 of a NRT score series with the path score for the current time interval. The latency path score visual representation 151 charts, at each scored time, a path latency and a latency-based path score for the corresponding time interval.

Figure 2:
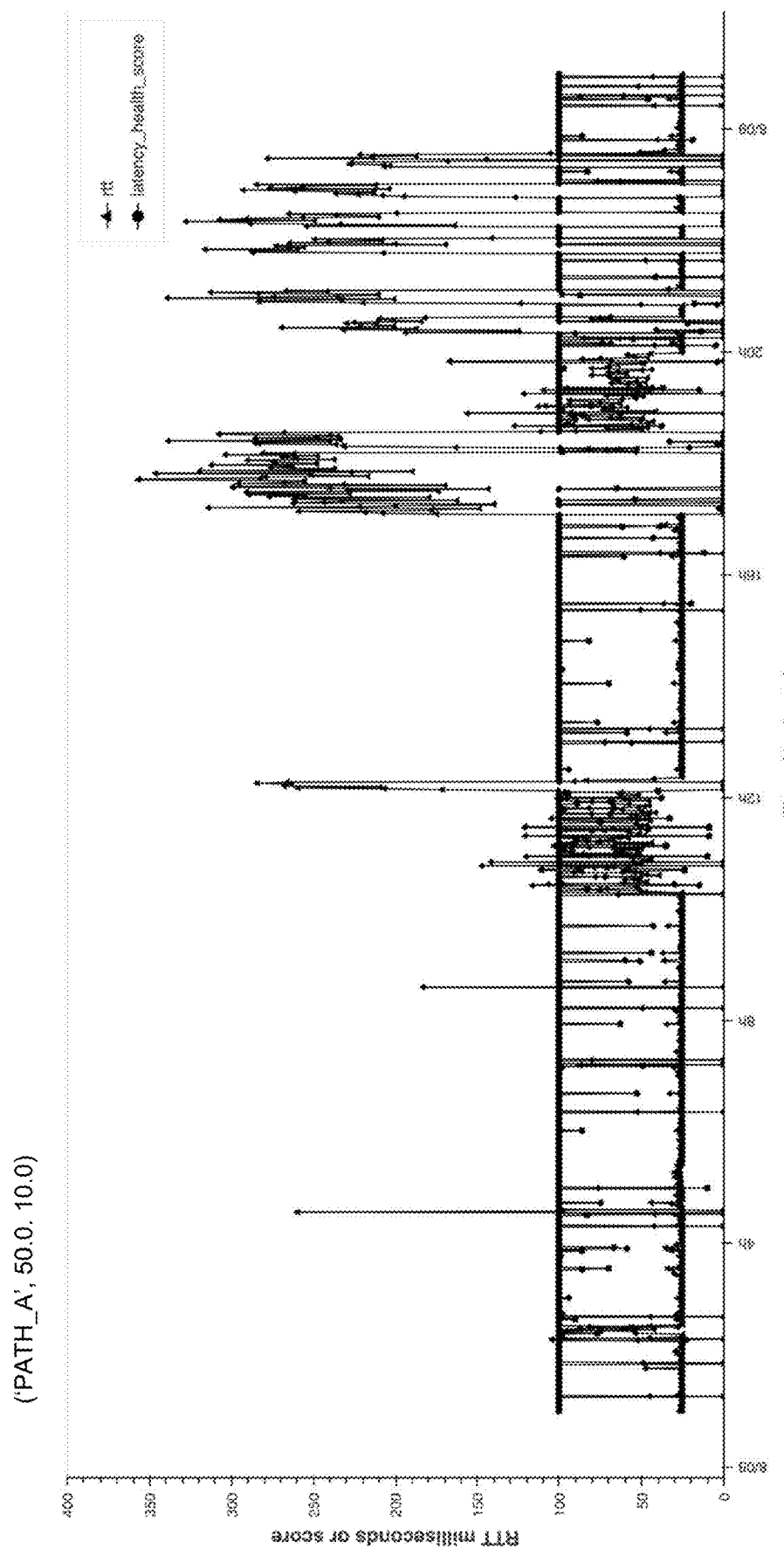
FIG. 2 is a visual representation of a time series of latency path scores and a time series of latencies over a 24 hour period.

FIG. 2 is a visual representation of a time series of latency-based path scores and a time series of path latencies over a 24 hour period. A visualization or graph 201 charts the NRT latency-based path scores with redsub and round trip times (RTTs) with triangles. The visualization is for a path identified as PATH_A having ingress bandwidth of 50 megabits/second (mbps) and an egress bandwidth of 10 mbps. The x-axis ranges from 0 to 400 to encompass the latency-based path scores that range from 0 to 100 and the RTTs that range from >0 ms to 400 ms. Typical latency for the path seems to be approximately 25 ms. The latency-based path scoring drops to 0 intermittently which indicates a recurring, but transient issue for investigation. The series of poor scores and latency after hour 16 signifies an ongoing problem severely impacting the path.

Figure 3:
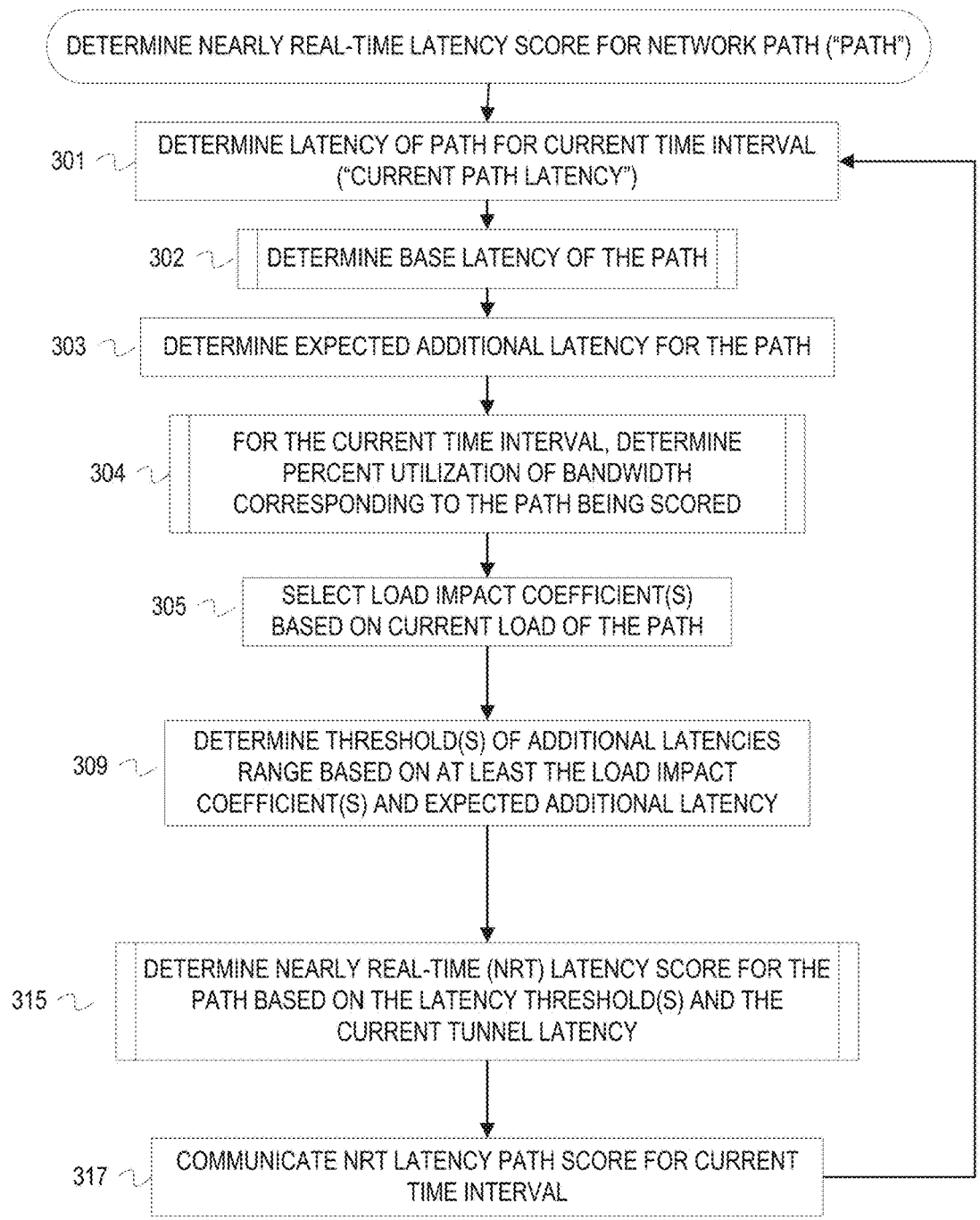
FIG. 3 is a flowchart of example operations for determining a nearly real-time health score for a network path based on latency data.

FIG. 3 is a flowchart of example operations for determining a nearly real-time health score for a network path based on latency data. The scoring is nearly real-time due to the delay that occurs between an event (elapse of a time interval) and both determining and using (e.g., display, feedback, and/or control) the health score. The operations are presumed to be ongoing. This ongoing scoring can be used to identify transient/ephemeral issues that can repeat and impact performance of applications. In addition, a scoring system likely iteratively scores network paths (e.g., each tunnel provisioned on a circuit). Using the example of a tunnel as a path, the scoring system can choose a circuit and then score each tunnel provisioned on the circuit based on the latency data of the chosen tunnel and the bandwidth capacity and load information of the circuit. The example operations are described with reference to a scoring system for consistency with FIG. 1. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

At block 301, a scoring system determines latency for a network path for a current time interval ("current path latency"). The path latency is based on latency data of a network path. The scoring system can detect the latency for the current time interval by various means depending upon the monitoring infrastructure and application organization. For instance, a process or thread of the scoring system can detect that latency for a time interval is written to a monitored location. As another example, a process or thread can receive the RTTs for the current time interval as calculated by another entity collecting latency data (e.g., program, process, etc.) and then calculate statistical information. At time interval elapse, the scoring system can query a repository or application for the latency of the last minute or at a specified time for a selected network path being scored.

At block 302, the scoring system determines a base latency. The base latency for the network path is preferably measured under no load conditions (e.g., <1% load). With no load conditions, the base latency is primarily a function of the (physical or logical) distance between the endpoints of the network path. When available, recent samples occurring in no load conditions are used to measure the latency and used as a base latency for a current scoring interval. A time boundary is configured to establish samples that qualify as "recent" with respect to a current time interval (e.g., within h hours or within ti time intervals of the current time interval). When sufficient and recent no load condition samples are not available, the scoring system can be configured to use a latency of a different load range/bin as base latency. The selection of load bin is based on a lowest load bin with sufficient, recent samples. This determination of base latency allows for scoring to adjust to route changes. Example operations for determining base latency are depicted in FIG. 4.

Figure 4:
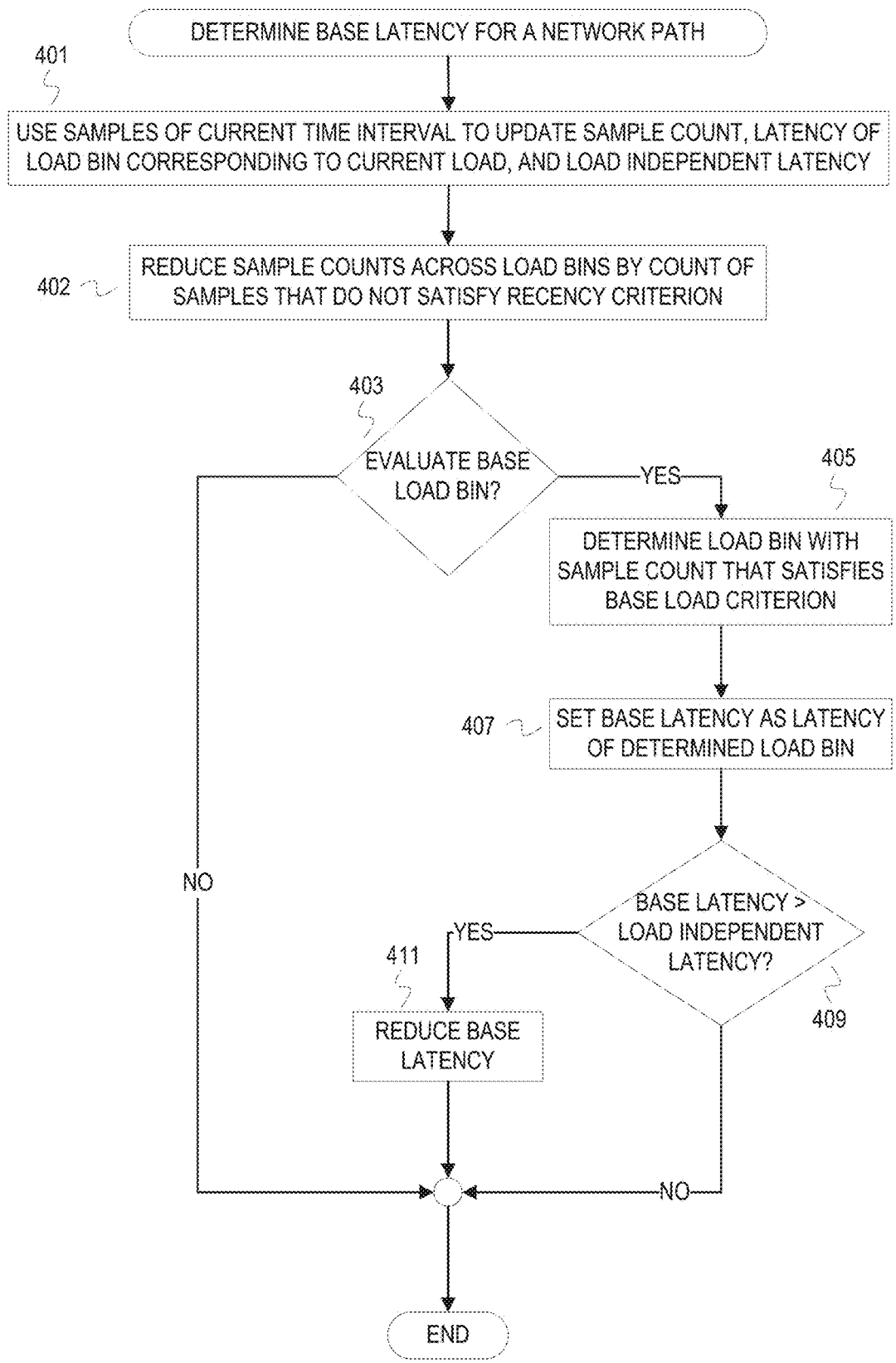
FIG. 4 is a flowchart of example operations for determining base latency of a network path.

FIG. 4 is a flowchart of example operations for determining base latency of a network path. To satisfy criteria of sufficiency and recency, a scoring system can be configured to maintain path latencies for a network path for different load bins encompassing different ranges of load conditions. The scoring system uses latency of a "base load bin" as the base latency. The base load bin is the lowest load bin with sufficient, recent samples. As stated earlier, the criteria for sufficiency and recency (e.g., >=1000 samples within the last 3 hours) are configurable and can be tuned.

At block 401, the scoring system uses the samples of the current time interval to update sample count, latency of a load bin corresponding to the current load, and load independent latency. The scoring system maintains load bins similar to the load buckets maintained for additional latency coefficients. Indeed, embodiments can use the same load bins structure to associate the coefficients and the load bin latencies. The use of "bin" is not intended to create a distinction from bucket, but merely to aid in differentiating the different uses of the load bins/buckets. The scoring system can be configured to have load bins at 1% granularity through the entire range of load or decrease the granularity/sub-range per bin at higher loads (e.g., >=70%). The scoring system increments the sample count for the load bin corresponding to the current load with the sample count for the current time interval. In addition, the scoring system updates the latency of the load bin corresponding to the current load with the current latency. For example, the latency per load bin is maintained as an exponential moving average to facilitate emphasis of most recent samples. In addition, the scoring system tracks latency across time intervals regardless of load—a load independent latency. Similar to the latencies per load bin, the scoring system maintains load independent with more influence from the most recent samples than older samples (i.e., recent latency behavior is expressed more than older latency behavior). The scoring system can maintain load independent latency as a moving average, such as an exponential moving average or weighted moving average.

At block 402, the scoring system reduces sample counts across load bins by counts of samples that do not satisfy a recency criterion. The scoring system iterates over the load bins and determines a count of samples for each load bin that does not satisfy the recency criterion ("aged samples count"). The scoring system then decrements the sample count for the load bin by the aged sample count. Timestamps or interval identifiers can be maintained with interval-specific sample counts to enforce a recency criterion.

At block 403, the scoring system determines whether to evaluate the base load bin for the network path being scored. One or more conditions can be defined for evaluating base load bin. For example, base load bin may be periodically evaluated according to a schedule. The base load bin may also/instead be evaluated in response to a defined trigger, for example, if load independent latency has changed significantly and stabilized over a last n scoring intervals. If the base load bin is not to be evaluated, then operational flow ends for determining base latency but continues on to determining expected additional latency (e.g., continues to block 303). Otherwise, operational flow proceeds to block 404.

At block 405, the scoring system determines which of the load bins has a sample count that satisfies the base load criterion. With the recency criterion enforced through the maintenance of sample counts, the base load criterion may be expressed as a sufficiency criterion. As an example, the base load criterion may be "load bin with highest sample count" or "lowest load bin with highest sample count beyond a margin of 20 samples." As another example, the base load criterion may be "lowest load bin with at least a 500 sample count."

At block 407, the scoring system sets the base latency for the network path as the latency of the load bin determined as satisfying the base load criterion.

At block 409, the scoring system determines whether the base latency is greater than the load independent latency. A route change that impacts latency behavior may be captured with the load independent latency and not the latency of the base load bin because of insufficient samples. To prevent this situation from yielding an inaccurate representation of latency-based path health, the scoring system reduces the base latency at block 411. The scoring system can be configured to reduce the base latency to a value within a range Load_Independent_Latency<=New_Base_Latency<Base_Latency. As a specific example, the scoring system can reduce the base latency to the load independent latency. If the base latency is not greater than the load independent latency, then operational flow for determining base latency ends.

Returning to FIG. 3, the scoring system determines an expected additional latency at block 303. The expected additional latency is determined according to known latency adding operations implemented at one or both ends of the path (e.g., based on buffering for traffic shaping) and known latency added by intermediate devices. These values can be stored in a data structure that associates the path identifier with the values. The values can be stored in low latency memory to facilitate the near real-time scoring.

Figure 5:
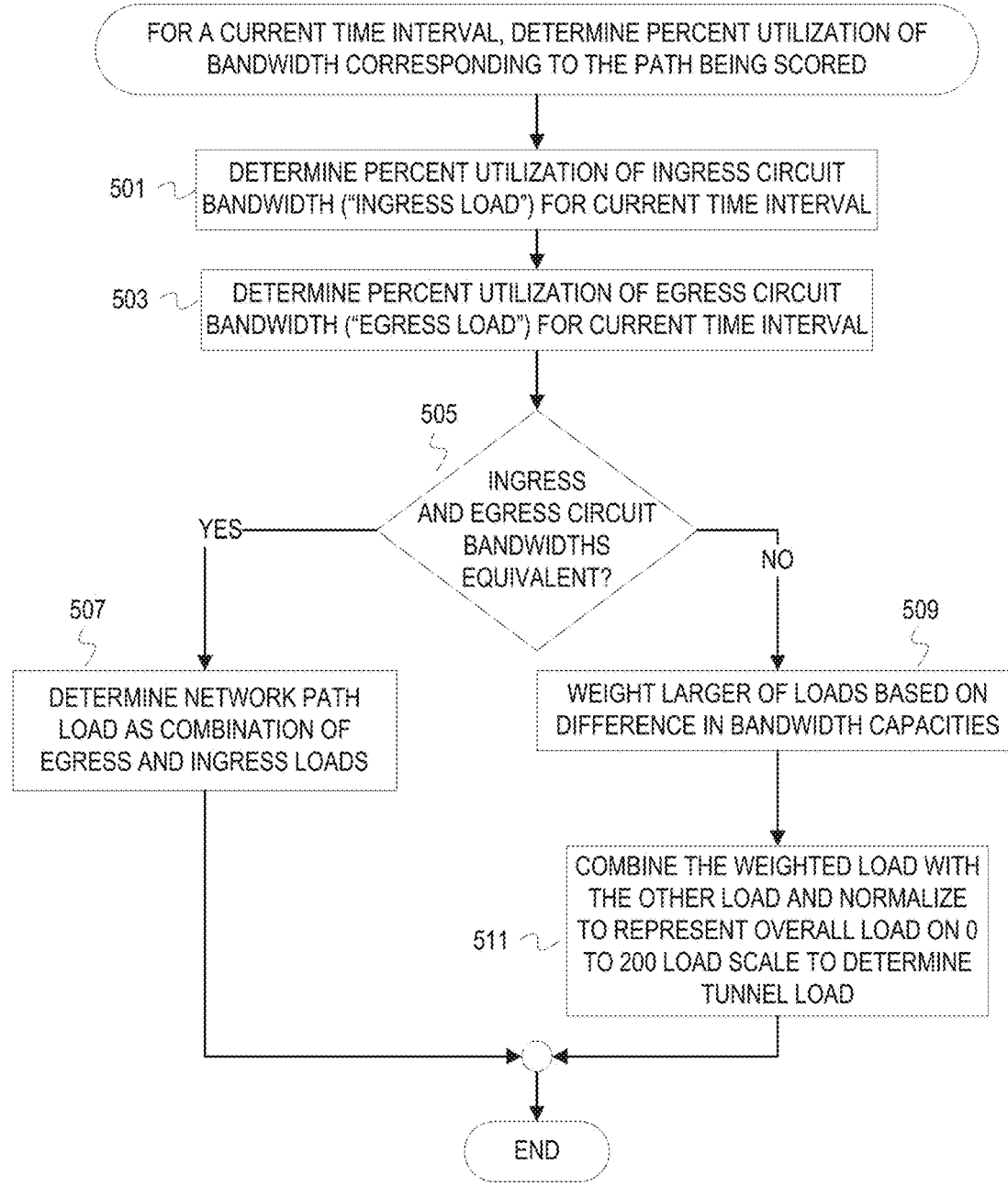
FIG. 5 is a flowchart of example operations for determining percent utilization of bandwidth for a network path being scored.

At block 304, the scoring system determines a current load of the path based on percent utilization of bandwidth (e.g., aggregate of ingress and egress bandwidths configured on a circuit) during the current time interval. As with the latency data for a time interval, the scoring system can interact or query another system or application to obtain the current load of the circuit corresponding to the path. In the example of the path being a tunnel provisioned on a circuit, the scoring system obtains and aggregates ingress load and egress load to determine an overall load as the load for scoring the path corresponding to the circuit. Example operations for aggregating ingress and egress loads are depicted in FIG. 5. Implementations of the scoring system may include functionality for computing load for scoring a path for the currently elapsed time interval.

At block 305, the scoring system selects a load impact coefficient(s) to apply to the expected additional latency based on the current load. As previously discussed, expected additional latency (e.g., from traffic shaping) will increase with load. The load impact coefficient is applied to the expected additional latency defined for the path to account for the increase in additional latency that occurs with load. Implementations can maintain a data structure for each path that indicates the load bins/buckets, from 0% to 200% in predetermined bucket/bin sizes, and associated impact load coefficient(s). For implementations that have a constant lower threshold for the range of expected additional latencies (e.g., 0 for the lower threshold), a load impact coefficient for the upper threshold is maintained. In other implementations, each load bin is associated with a load impact coefficient for calculating the lower threshold and a load impact coefficient for calculating the upper threshold.

At block 309, the scoring system determines a threshold(s) of additional latencies range based on at least the load impact coefficient(s) and the expected additional latency. If the scoring formula uses upper and lower thresholds (i.e., no presumed lower threshold of 0), then the scoring system determines an upper threshold and a lower threshold. Embodiments can score the path with a formula that only uses an upper threshold and presumes a lower latency threshold of 0. Assuming an embodiment that uses both thresholds, the scoring system calculates the upper threshold as the product of the load impact coefficient and the expected additional latency. The scoring system calculates the lower threshold as a product of a load impact coefficient defined for the lower threshold at the current load and the additional latency. The load impact coefficients are defined according to expert knowledge and can also be influenced by administrator/customer preference. For instance, the lower threshold load impact coefficient can be set as 2, which would set the lower threshold to double the expected additional latency, and the upper threshold load impact coefficient can be set as 5.

At block 315, the scoring system determines a NRT latency score for the path based on the latency threshold(s) and the path's current additional latency. The scoring system computes the latency path score as a function of current additional latency and the thresholds of the range. The score quantifies health of a network path in terms of the current additional latency in relation to the range of expected additional latencies. Embodiments can allow for the scoring to go outside of a 0-100 score. FIG. 6 depicts example operations for scoring.

At block 317, the scoring system communicates the NRT latency-based path score for the current time interval. Communicating the score can be passing the score to a user interface engine, writing the score to a memory location monitored for scoring visualization, etc. Embodiments can compare each score against a configurable threshold for alarm or notification. For example, an alarm threshold can be defined at 30. If a score falls below the alarm threshold (or is less than or equal to the alarm threshold), then a notification can be generated (e.g., text message sent, graphical display updated with an indication of a low score, etc.) and/or an alarm triggered. Different thresholds can be set for different levels of urgency.

FIG. 5 is a flowchart of example operations for determining load of a current time interval. Aggregating ingress and egress loads to represent overall load for scoring a network path can be a straightforward summing of loads when the ingress and egress bandwidths are the same. However, summing loads when ingress/egress bandwidth capacities differ does not represent overall load with the most accurate value.

At block 501, the scoring system determines percent utilization of ingress circuit bandwidth ("ingress load") for a current time interval. For instance, the scoring system retrieves an already calculated ingress load from a monitoring system. Alternatively, the scoring system can determine an amount of data received in the current time interval and ingress capacity to calculate ingress load.

At block 503, the scoring system determines percent utilization of egress circuit bandwidth ("egress load") for the current time interval. For instance, the scoring system retrieves an already calculated egress load from a monitoring system. Alternatively, the scoring system can determine an amount of data transmitted in the current time interval and egress capacity to calculate the egress load.

At block 505, the scoring system determines whether the ingress and egress bandwidths are equivalent. If they are equivalent, then operational flow proceeds to block 507. If the bandwidths are not equivalent, then operational flow proceeds to block 509.

At block 507, the scoring system determines network path load as a combination (i.e., sum) of the egress and ingress loads.

At block 509, the scoring system weights the load of the larger bandwidth capacity based on a difference in bandwidth capacities. Since the ingress bandwidth capacity is more likely the larger, an illustration will presume that the ingress bandwidth capacity is x mbps and the egress bandwidth capacity is y mbps, with x>=y. The weight applied to the ingress load is based on the ratio of bandwidth capacities y/x. Thus, a weight w=⌊y/x⌋. The ingress load is represented as i_load, and the weighted ingress load is w*i_load.

At block 511, the scoring system combines the weighted load with the other load and normalizes the result to represent overall load on a 0-200% scale to determine load for path scoring ("scoring load"). Continuing with the above illustration and representing ingress load as i_load, normalized load would be computed as w*i_load+e_load. To illustrate, assume x=50 and y=10. With these bandwidths, w=0.2. Assuming ingress load of 15% and egress load of 30%, normalized load would be computed as 33%. The scoring load determined from either block 509 or 511 is used to select a load bucket and then an associated added latency coefficient(s). If multiple network paths corresponding to a same circuit are being scored, then the scoring can use the same scoring load for scoring each of the network paths.

FIG. 6 is a flowchart of example operations for determining the NRT latency score for the path based on an expected/acceptable additional latency range and the current additional latency of the path. FIG. 6 presumes current path latency has been determined already (block 301). These example operations present one illustration for scoring that expresses a latency based path score as a function of current additional latency and a range of acceptable additional latencies defined by an upper threshold and a lower threshold. In addition, the example operations of FIG. 6 presume scoring that ranges from 0 (worst) to 100 (best).

At block 620, the scoring system calculates additional latency of the current time interval. The scoring system calculates the current additional latency as the difference between the current latency and the base latency. The additional latency of the current time interval can be expressed as Current_Additional_Latency=Current_Latency−Base Latency).

At block 621, the scoring system determines whether the current additional latency is less than or equal to the lower threshold of the acceptable/expected range of additional latency. The lower threshold is calculated or set so that a path with a current additional latency proximate to the lower threshold and less than the lower threshold scores very well (e.g., 100 on a 0 to 100 scoring scale). The scoring system could be configured to set the lower threshold to the expected additional latency, but that may depress scores that deviate slightly from the expected additional latency. Therefore, a lower threshold load impact coefficient can be defined that will set the lower threshold at something greater than the expected additional latency but still considered "good" for additional latency. If the current additional latency is less than or equal to the lower threshold, then operational flow proceeds to block 623. Otherwise, operational flow proceeds to block 625.

At block 623, the path score is set to 100.

At block 625, the path score is calculated based on both thresholds. The scoring system computes a percentage of the current additional latency within the range defined by the thresholds. This value is calculated as ((Current_Additional_Latency−Lower_Threshold)*100/(Upper_Threshold−Lower_Threshold)). The scoring system subtracts the computed value from 100. Since the minimum score is 0, a MAXIMUM function is used to select 100 if the resulting value is greater than 100 to prevent negative scores. Implementations can allow for negative scores to use, for example, as indications of severity of a problem.

Figure 7:
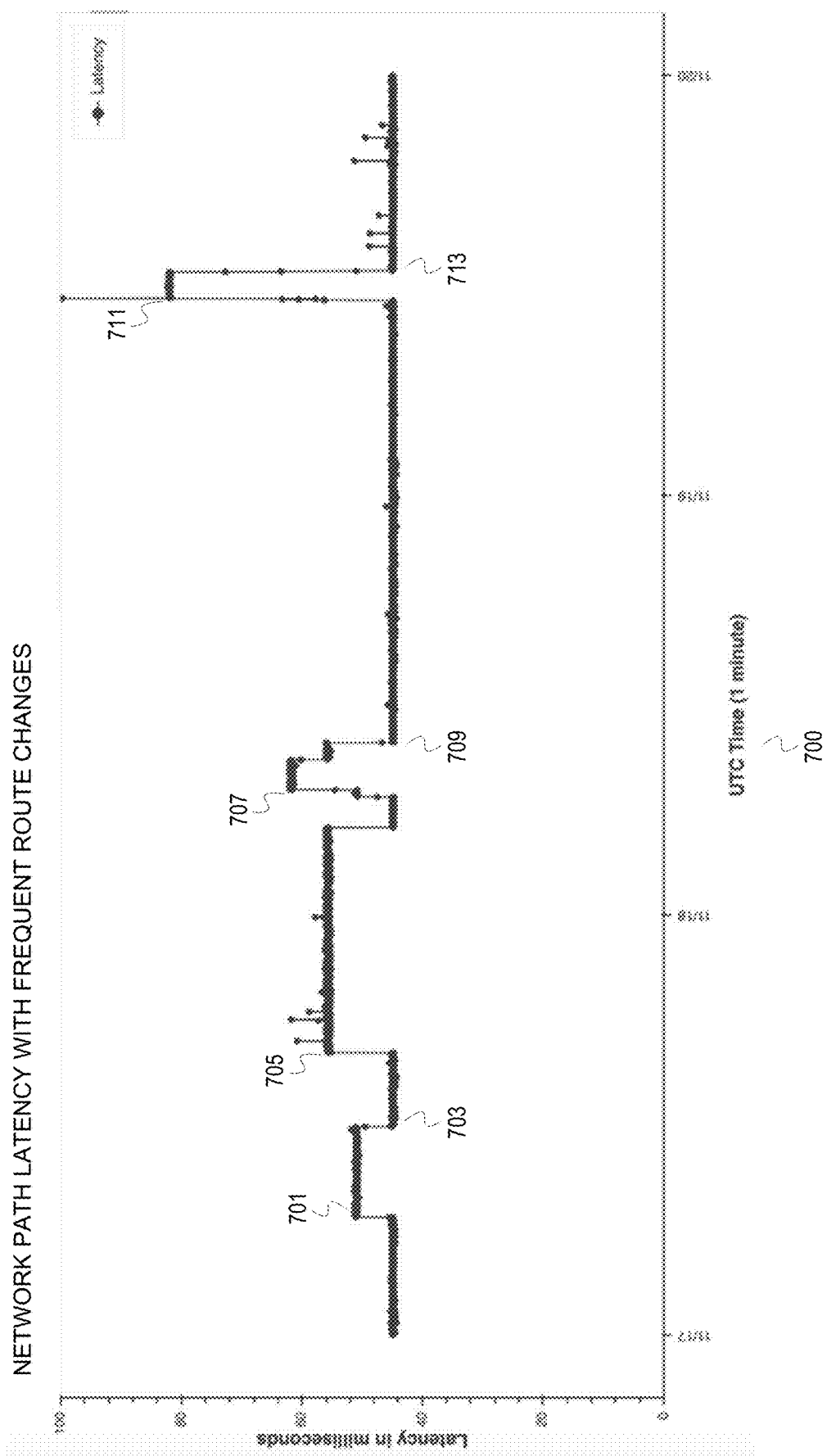
FIG. 7 is a chart of latency over 3 days that shows frequent, but clear route changes.
Figure 8:
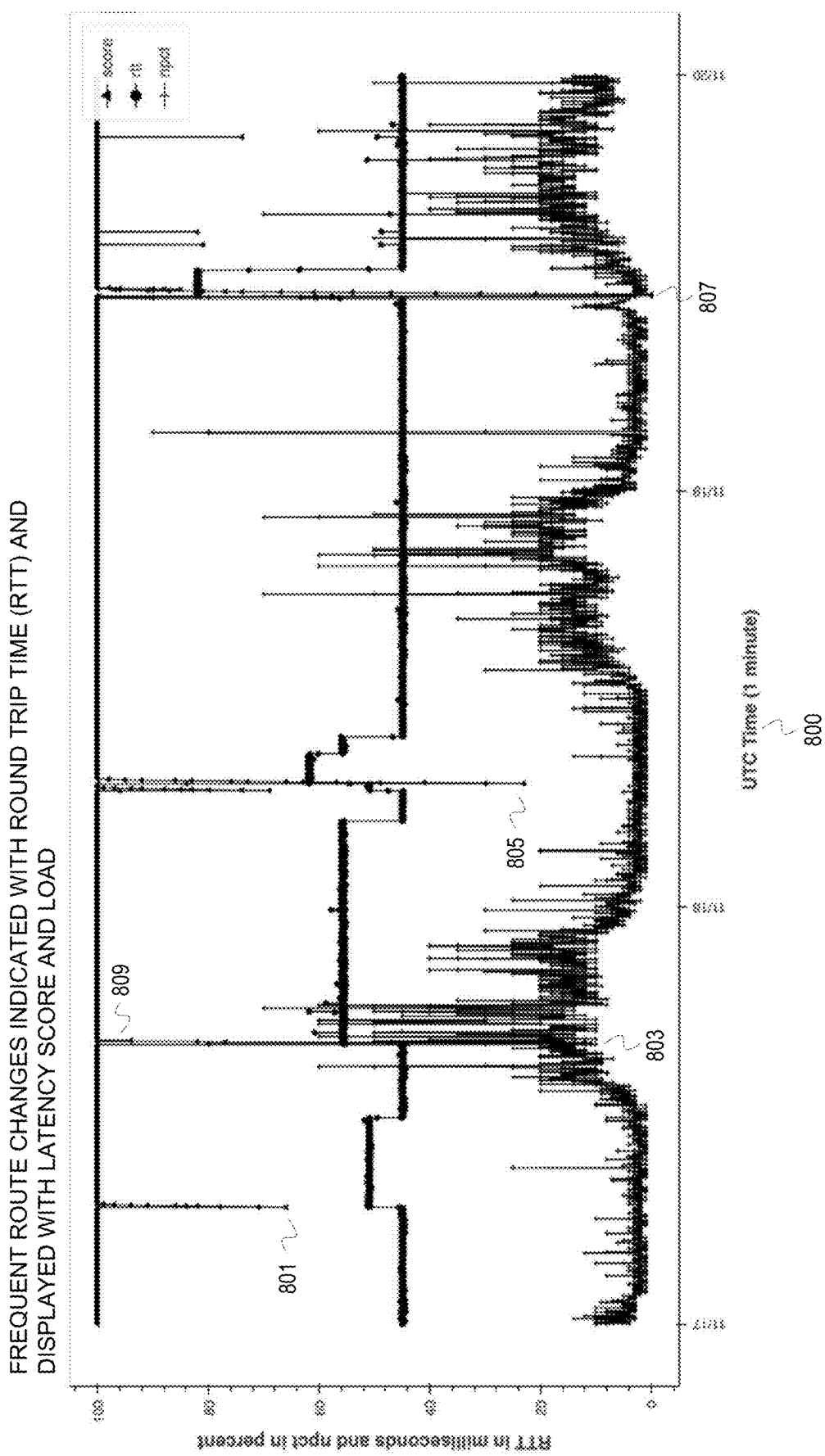
FIG. 8 is a chart of the latency of FIG. 7 correlated with latency scores and load.

FIGS. 7 and 8 are charts of latency that indicate likely route changes for a network path. FIG. 7 is a chart of latency over 3 days that shows frequent, but clear route changes. FIG. 8 is a chart of the latency of FIG. 7 correlated with latency scores and normalized load percentage, which is identified as 'npct,' on a chart 800. Route change analysis should detect a route change based on the stable changes in latency that show as step functions in a chart. In FIG. 7, route change analysis detects seven route changes at points identified with labels 701, 703, 705, 707, 709, 711, 713 on a chart 700. The scoring system should make corresponding changes to the base latency of the network path that adapts the scoring to the route change either from the periodic evaluation of base load bin or an evaluation trigger. Since route change analysis relies on accumulation of observations, scoring at the beginning of a route change to a route with higher latency can skew the scoring towards a lower score before the scoring adapts. This is illustrated at the points labeled as 801, 803, 805, 807 on the triangle marked trend line that depicts latency score. FIG. 8 depicts the load observations (npct) with vertical bars and latency observations (rtt) with circles. The load observations are observations of aggregated, normalized, ingress and egress loads. A series of scores at 809 illustrate adaptation of the scoring to a higher latency route and higher load later in the evening of November 17. While scoring can adapt to route changes, embodiments can impose constraints on the adapting to use a poor scoring to express an undesirable or unacceptable route change beyond a configured threshold (e.g., changing to a route that is 100 ms slower than a threshold).

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operation depicted in block 303 may be performed after either of blocks 304 or 305. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 9:
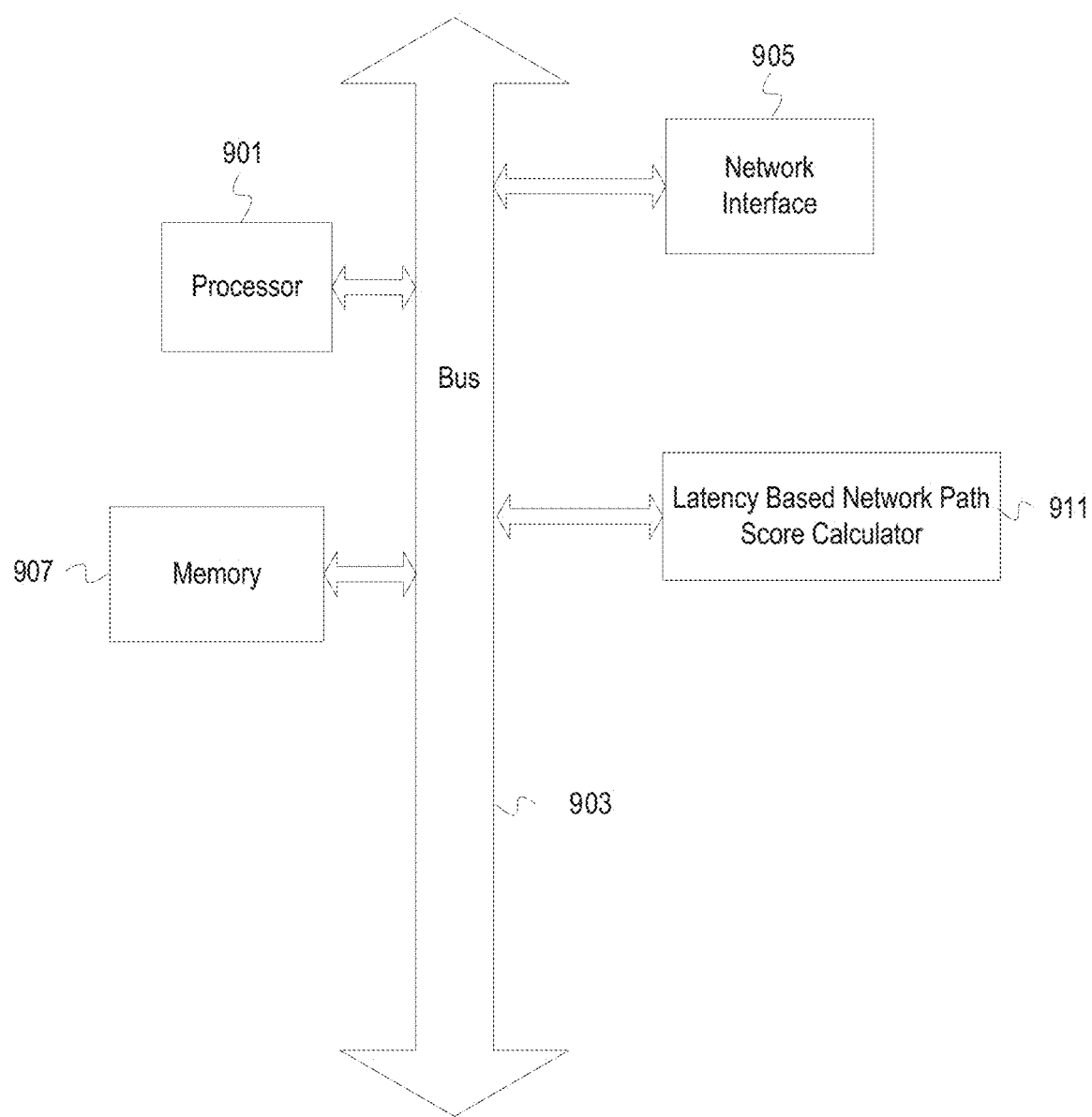
FIG. 9 depicts an example computer system with a NRT latency based network path score calculator.

FIG. 9 depicts an example computer system with a NRT latency based network path score calculator. The computer system includes a processor 901 (possibly including multiple processors, multiple cores, multiple nodes, and/or implementing multi-threading, etc.). The computer system includes memory 907. The memory 907 may be system memory or any one or more of the above already described possible realizations of machine-readable media. The computer system also includes a bus 903 and a network interface 905. The system also includes a NRT latency-based network path score calculator 911. The NRT latency-based path score calculator 911 scores a network path based on current additional latency and thresholds defining a range of expected/acceptable additional latencies that can vary with load. The NRT latency-based network path score calculator 911 determines a base latency, expected additional latency, and a load impact coefficient(s) at each scoring interval. The load impact coefficient(s) and expected additional latency are determined based on current load. The NRT latency based path score calculator 911 computes lower and upper thresholds with the load impact coefficients and expected additional latency. The latency based network path score calculator 911 then scores the network path as a function of the current additional latency relative to the thresholds. Any one of the previously described functionalities may be partially (or entirely) implemented in hardware and/or on the processor 901. For example, the functionality may be implemented with an application specific integrated circuit, in logic implemented in the processor 901, in a co-processor on a peripheral device or card, etc. Further, realizations may include fewer or additional components not illustrated in FIG. 9 (e.g., video cards, audio cards, additional network interfaces, peripheral devices, etc.). The processor 901 and the network interface 905 are coupled to the bus 903. Although illustrated as being coupled to the bus 903, the memory 907 may be coupled to the processor 901.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A non-transitory, machine-readable medium having program code stored thereon, the program code comprising instructions when executed by a processor, to:
   after each lapse of a time interval,
   determine load corresponding to a network path for the elapsed time interval and latency of the network path for the elapsed time interval;
   select a first coefficient based, at least in part, on the load;
   determine an upper additional latency threshold for the network path for the elapsed time interval,
      wherein the instructions to determine the upper additional latency threshold comprise instructions to calculate the upper additional latency threshold based, at least in part, on the first coefficient and an expected additional latency that is defined based on at least one of a latency adding operation and one or more intermediate devices on the network path;
   determine a current additional latency of the network path for the elapsed time interval based, at least in part, on a base latency and the latency of the network path for the elapsed time interval; and
   score the network path based, at least in part, on the current additional latency of the network path for the elapsed time interval and the upper additional latency threshold.

2. The non-transitory, machine-readable medium of claim 1, wherein latency is indicated with round-trip time data.

3. The non-transitory, machine-readable medium of claim 1, wherein the instructions to score the network path comprise the instructions to score the network path as a percentage of the current additional latency of the network path for the elapsed time interval within a range defined by the upper additional latency threshold.

4. The non-transitory, machine-readable medium of claim 1, wherein the program code further comprises instructions to:
   determine a lower additional latency threshold, wherein the instructions to determine the lower additional latency threshold comprise instructions to determine the lower additional latency threshold as 0 or instructions to determine the lower additional latency threshold as a product of a second coefficient that is based on the determined load and the defined expected additional latency; and wherein the instructions to score the network path comprise instructions to score the network path also based on the determined lower additional latency threshold.

5. The non-transitory, machine-readable medium of claim 1, wherein the instructions to determine the load of the network path comprise instructions to determine percentage utilization of ingress and egress bandwidths of a circuit corresponding to the network path and to aggregate the utilization percentages.

6. The non-transitory, machine-readable medium of claim 5, wherein the instructions to aggregate the utilization percentages comprise instructions to sum the utilization percentages if ingress and egress bandwidths are equivalent and to normalize a first of the utilization percentages with respect to a second of the utilization percentages if the bandwidths are not equivalent.

7. The non-transitory, machine-readable medium of claim 1, wherein the program code further comprises instructions to:

maintain latency moving averages for each of a plurality of different load bins;

determine as a base load bin a lowest of the plurality of load bins with latency samples that satisfy a recency criterion and a sufficiency criterion; and determine a base latency based, at least in part, on the latency moving average maintained for the determined base load bin; and wherein the instructions to determine the current additional latency of the network path for the elapsed time interval comprise instructions to determine an offset of a latency of the network path for the elapsed time interval from the base latency.

8. An apparatus comprising:
a processor; and
a non-transitory computer-readable medium having instructions stored thereon that are executable by the processor to cause the apparatus to, determine load corresponding to a network path for an elapsed time interval and latency of the network path for the elapsed time interval;

select a first coefficient based, at least in part, on the load;

determine an upper additional latency threshold for the network path for the elapsed time interval,
wherein the instructions to determine the upper additional latency threshold comprise instructions to calculate the upper additional latency threshold based, at least in part, on the first coefficient and an expected additional latency that is defined based on at least one of a latency adding operation and one or more intermediate devices on the network path;

determine a current additional latency of the network path for the elapsed time interval based, at least in part, on a base latency and the latency of the network path for the elapsed time interval; and score the network path based, at least in part, on the current additional latency of the network path for the elapsed time interval and the upper additional latency threshold.

9. The apparatus of claim 8, wherein the computer-readable medium further has instructions executable by the processor to cause the apparatus to:

maintain latency moving averages for each of a plurality of different load bins;

determine as a base load bin a lowest of the plurality of load bins with latency samples that satisfy a recency criterion and a sufficiency criterion; and determine a base latency based, at least in part, on the latency moving average maintained for the determined base load bin; and wherein the instructions to determine the current additional latency of the network path for the elapsed time interval comprise instructions executable by the processor to cause the apparatus to determine an offset of a latency of the network path for the elapsed time interval from the base latency.

10. The apparatus of claim 8, wherein the computer-readable medium further has stored thereon instructions executable by the processor to cause the apparatus to:

determine a lower additional latency threshold for the network path for the elapsed time interval, wherein the instructions to determine the lower additional latency threshold comprise instructions to determine the lower additional latency threshold as 0 or instructions to determine the lower additional latency threshold as a product of a second coefficient and the defined expected additional latency;

wherein the instructions to select the first coefficient also comprise instructions to select a second coefficient based, at least in part, on the load; and wherein the instructions to score the network path comprise the instructions executable by the processor to cause the apparatus to score the network path also based on the determined lower additional latency threshold.

11. The apparatus of claim 8, wherein the instructions to score the network path comprise instructions executable by the processor to cause the apparatus to score the network path as a percentage of the current additional latency of the network path for the elapsed time interval within a range defined by the upper additional latency threshold.

12. The apparatus of claim 8, wherein the instructions to determine the load of the network path comprise instructions executable by the processor to cause the apparatus to determine percentage utilization of ingress and egress bandwidths of a circuit corresponding to the network path and to aggregate the utilization percentages.

13. The apparatus of claim 12, wherein the instructions to aggregate the utilization percentages comprise instructions executable by the processor to cause the apparatus to sum the utilization percentages if ingress and egress bandwidths are equivalent and to normalize a first of the utilization percentages with respect to a second of the utilization percentages if the bandwidths are not equivalent.

14. A method comprising:
after each lapse of a time interval, determining load corresponding to a network path for the elapsed time interval and latency of the network path for the elapsed time interval;

selecting a first coefficient based, at least in part, on the load;

determining an upper additional latency threshold an for the network path for the elapsed time interval, wherein determining the upper additional latency threshold comprises calculating the upper additional latency threshold based, at least in part, on the first coefficient and an expected additional latency that is defined based on at least one of a latency adding operation and one or more intermediate devices on the network path;

determining a current additional latency of the network path for the elapsed time interval based, at least in part, on a base latency and the latency of the network path for the elapsed time interval; and scoring the network path based, at least in part, on the current additional latency of the network path for the elapsed time interval and the upper additional latency threshold.

15. The method of claim 14, wherein latency is indicated with round-trip time data.

16. The method of claim 14, wherein scoring the network path comprises scoring the network path as a percentage of the current additional latency of the network path for the elapsed time interval within a range defined by the upper additional latency threshold.

17. The method of claim 14, further comprising:

determining a lower additional latency threshold, wherein determining the lower additional latency threshold comprises determining the lower additional latency threshold as 0 or as a product of a second coefficient that is based on the determined load and the defined expected additional latency, and wherein scoring the network path includes scoring the network path also based on the determined lower additional latency threshold.

18. The method of claim 14, wherein determining the load of the network path comprises determining percentage utilization of ingress and egress bandwidths of a circuit corresponding to the network path and aggregating the utilization percentages.

19. The method of claim 18, wherein aggregating the utilization percentages comprises summing the utilization percentages if ingress and egress bandwidths are equivalent and normalizing a first of the utilization percentages with respect to a second of the utilization percentages if the bandwidths are not equivalent.

20. The method of claim 14 further comprising:

maintaining latency moving averages for each of a plurality of different load bins;

determining as a base load bin a lowest of the plurality of load bins with latency samples that satisfy a recency criterion and a sufficiency criterion; and determining a base latency based, at least in part, on the latency moving average maintained for the determined base load bin; and wherein determining the current additional latency of the network path for the elapsed time interval comprises determining an offset of a latency of the network path for the elapsed time interval from the base latency.

* * * * *